(12) United States Patent
Vesely et al.

(10) Patent No.: US 8,623,533 B2
(45) Date of Patent: Jan. 7, 2014

(54) HIGH TEMPERATURE FUEL CELL SYSTEM WITH AN ELECTRICAL HEATER

(75) Inventors: Charles Vesely, Andover, MN (US); Bradford Palmer, Ham Lake, MN (US); Xin Li, Blaine, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 1350 days.

(21) Appl. No.: 11/855,574

(22) Filed: Sep. 14, 2007

(65) Prior Publication Data

US 2009/0075124 A1    Mar. 19, 2009

(51) Int. Cl.
*H01M 8/04*    (2006.01)

(52) U.S. Cl.
USPC .............................................. 429/9; 429/410

(58) Field of Classification Search
USPC ...................................................... 429/9, 410
See application file for complete search history.

(56) References Cited

U.S. PATENT DOCUMENTS

| 7,361,424 | B2 * | 4/2008 | Jankowski et al. | ........... 429/425 |
| 7,732,076 | B2 * | 6/2010 | Zheng et al. | ................. 429/423 |
| 2002/0081468 | A1 * | 6/2002 | Shioya | ............................. 429/19 |
| 2007/0166581 | A1 | 7/2007 | Terazaki et al. | |
| 2007/0190379 | A1 | 8/2007 | Song et al. | |

FOREIGN PATENT DOCUMENTS

JP    2004-142831    5/2004

OTHER PUBLICATIONS

International Preliminary Report on Patentability for international patent application No. PCT/US2008/071460, dated Mar. 16, 2010.
Written Opinion of the International Searching Authority for international patent application No. PCT/US2008/071460, dated Jan. 7, 2009.
International Search Report issued for co-pending application No. PCT/US2008/071460, mailed Jan. 7, 2009.

* cited by examiner

*Primary Examiner* — Mark F Huff
*Assistant Examiner* — Monique Wills
(74) *Attorney, Agent, or Firm* — Foley & Lardner LLP

(57) ABSTRACT

Methods and systems for maintaining near operational mode internal temperatures of a high temperature fuel cell system during a hibernation mode are provided. Embodiments of the claimed invention include powering an electric heater adjacent to the high temperature fuel cell system to heat the high temperature fuel cell system. The use of an electrical heater allows the fuel cell system to maintain approximate operation mode internal temperatures during a hibernation mode and eliminates the problems of excess noise, vibration and exhaust emissions typical of previous fuel cell system heating methods. Gross energy savings of 67% and a fuel consumption reduction rate of 33% have been shown when substituting this method with previous fuel cell system heating methods with no additional manufacturing costs.

19 Claims, 2 Drawing Sheets

HIGH TEMPERATURE FUEL CELL SYSTEM WITH AN ELECTRICAL HEATER

FIELD

This disclosure relates generally to the field of high temperature fuel cells. More particularly, the disclosure relates to a method and system of maintaining near operation mode internal temperatures of high temperature fuel cell systems, such as solid oxide fuel cell ("SOFC") systems, during a hibernation mode.

BACKGROUND

High temperature fuel cell systems are known for their efficient use of fuel to develop DC and or AC electric power. Under normal operation, a typical high temperature fuel cell system, like a SOFC, system maintains a system temperature of approximately 700° C. For the high temperature fuel cell system to become operational, the system typically requires significant startup time, ranging anywhere between 1 to 4 hours from near ambient environmental conditions. When the system is not required to provide power, the typical system may be kept in a hibernation mode, whereby the normal fuel and air processes are reduced, stopped, or the system is allowed to cool. However, to avoid the significant time delay each time the high temperature fuel cell system is restarted from hibernation mode, it is desirable to maintain the internal system temperatures reasonably close to the normal system operation temperatures.

Maintaining internal temperatures of high temperature fuel cell systems during a hibernation mode allows for rapid recovery to a power producing operation mode. One known method for maintaining approximate operational level internal temperatures of the high temperature fuel cell system requires heating the high temperature fuel cell system with the system's base fuel stock through a combustor/recuperator system. Another known method for maintaining the internal temperature of the high temperature fuel cell system is to immerse the high temperature fuel cell system into a separate burner. Both methods require a significant amount of fuel and air supply flows to maintain heat and require controls that consume both significant amounts of fuel and parasitic power that waste a portion of the efficiencies achieved by the high temperature fuel cell system when in operation. Moreover, these methods create significant noise, vibration and exhaust emissions.

For the reasons stated above, and for other reasons stated below that will become apparent to those skilled in the art upon reading and understanding the present specification, there is a need in the art for an improved method and system for near operational level internal temperatures of a high temperature fuel cell system during a hibernation mode without an increase in manufacturing costs.

SUMMARY

This disclosure relates to improved methods and systems for maintaining near operational mode internal temperatures of a high temperature fuel cell system during a hibernation mode by powering an electrical heater close coupled to the high temperature fuel cell to intermittently heat the high temperature fuel cell system. Unlike the prior art methods of heating a high temperature fuel cell system, an electrical heater, that uses an electrical component to generate heat, allows the fuel cell system to maintain approximate operation mode internal temperatures during a hibernation mode and eliminates the problems of excess noise, vibration and exhaust emissions typical of previous fuel cell system heating. Gross energy savings of 67% and a fuel consumption reduction rate of 33% have been shown when substituting this method with previous fuel cell system heating methods with no additional manufacturing costs.

In one embodiment, a system for heating a high temperature fuel cell is provided. The system comprises a high temperature fuel cell, an electrical heater close coupled to the high temperature fuel cell and an alternate power source coupled to the electrical heater. When the system is in a hibernation mode, the electrical heater draws power from the alternate power source and provides resistive heat to the fuel cell. When the system is in an operation mode the electrical heater is turned off. In some embodiments, the high temperature fuel cell system can be a solid oxide fuel cell system and the electrical heater is an electrical resistance heater. In some embodiments the electrical resistance heater is a convection heater. In other embodiments the electrical resistance heater is a radiative heater. In one embodiment, the system also comprises a charge monitoring circuit. Furthermore, the alternate power source can be at least one rechargeable battery, wherein during the hibernation mode, the charge monitoring circuit monitors the charge of the at least one rechargeable battery and switches the system from the hibernation mode to the operation mode to charge the at least one rechargeable battery when a charge of the at least one rechargeable battery reaches a preset lower limit. The at least one rechargeable battery switches from the operation mode to the hibernation mode when the at least one rechargeable battery is charged to the full charge capacity and no power is being drawn from an external load. The system can further comprise a thermal insulation section to retain heat within the high temperature fuel cell.

In another embodiment, a high temperature fuel cell is provided. The high temperature fuel cell comprises a fuel cell section for generating power to a load, a controls/exhaust section for regulating an amount of fuel and air sent to the fuel cell and an amount of fuel, water and gases to leave the fuel cell, and an electrical heater close coupled to the fuel cell section that provides heat to maintain an internal temperature of the fuel cell section. In some embodiments, the high temperature fuel call is a solid-oxide fuel cell. Also, the electrical heater can be an electrical resistance heater. In some embodiments the electrical resistance heater is a convection heater. In other embodiments the electrical resistance heater is a radiative heater. Also, the high temperature fuel cell can comprise a thermal insulation section to retain heat within the high temperature fuel cell.

In another aspect of the claimed invention, a system for maintaining the internal temperatures of a high temperature fuel cell during a hibernation mode is provided. The system comprises a high temperature fuel cell, an electrical resistance heater close coupled to the high temperature fuel cell, and an alternate power source coupled to the electrical resistance heater such that the electrical resistance heater draws power from the alternate power source to provide resistive heat to the high temperature fuel cell during a hibernation state and is charged by the solid-oxide fuel cell during an operation state.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve systems and methods for maintaining near operation mode internal temperatures of high temperature fuel cell systems, such as solid oxide fuel cell ("SOFC") systems, during a hibernation mode. Advantageously, these embodiments provide a fuel efficient method of maintaining the internal system temperature of a high temperature fuel cell system while the system is in hibernation mode and at the same time reducing noise, vibration and exhaust emissions typically found in other methods of heating high temperature fuel cell systems.

Figure 1:
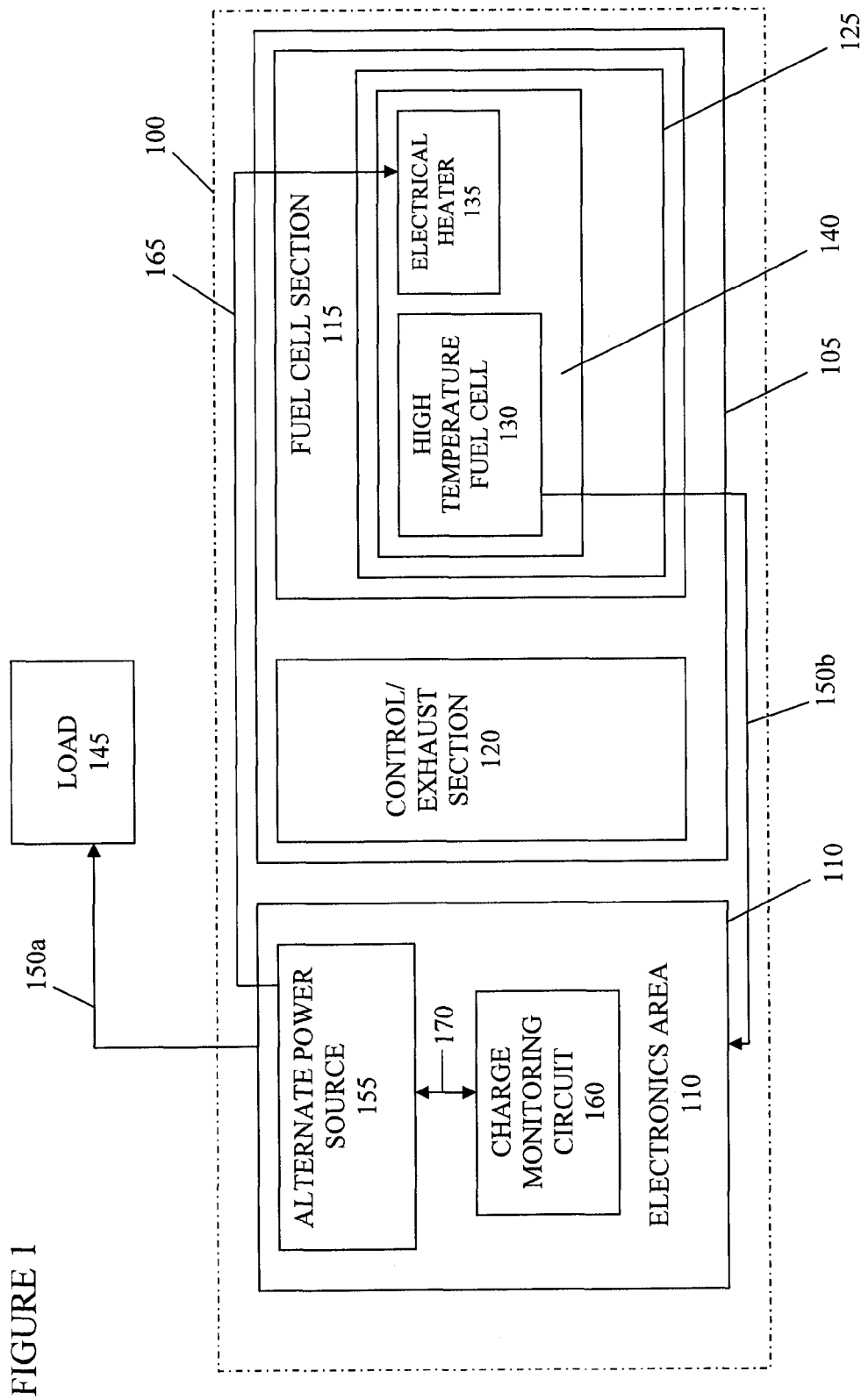
FIG. 1 is a block diagram of one embodiment of a system for heating a high temperature fuel cell system as described in the present application.
Figure 2:
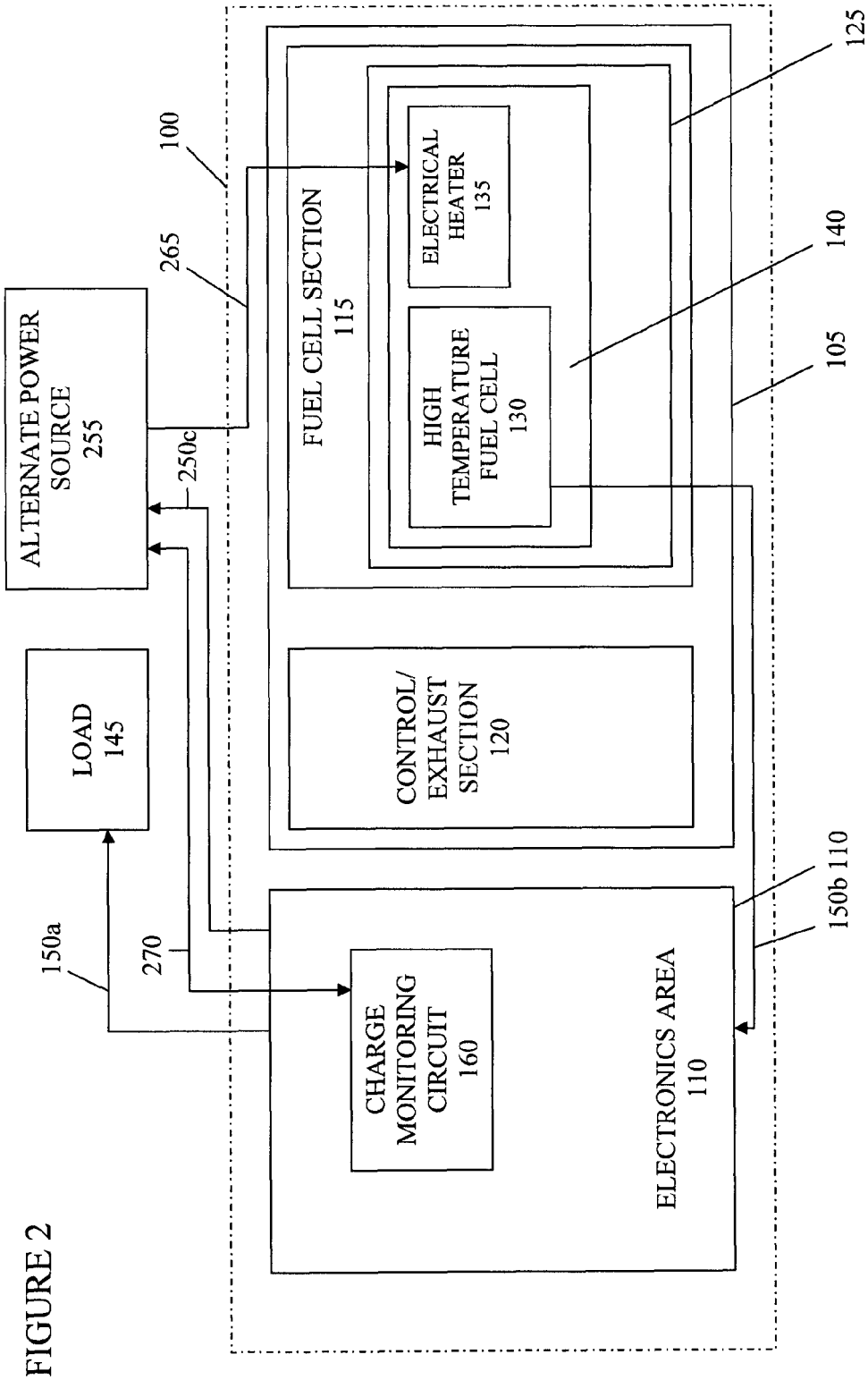
FIG. 2 is a block diagram of another embodiment of a system for heating a high temperature fuel cell system as described in the present application

FIGS. 1 and 2 are block diagrams of a system for heating a high temperature fuel cell system 100 according to two embodiments of the present invention. In both FIGS. 1 and 2, the system 100 includes a fuel cell area 105 and an electronics area 110. The fuel cell area 105 comprises a fuel cell section 115 and a controls/exhaust section 120. The fuel cell section 115 is housed within a thermal casing 125 and comprises a high temperature fuel cell 130 and an electrical heater 135 close coupled to the fuel cell 130. In some embodiments, the high temperature fuel cell 130 is a SOFC. The high temperature fuel cell 130 and the electrical heater 135 are surrounded by a thermal insulation 140. An electrical heater, as defined herein, is a type of heater that uses an electrical component to generate heat. In some embodiments, the electrical heater 135 is an electric resistance heater. More particularly, in some embodiments the electrical resistance heater is a convection heater. In other embodiments the electrical resistance heater is a radiative heater using radiant heat panels.

The controls/exhaust section 120 comprises controls (not shown) that regulate the amount of fuel sent to the fuel cell 130 from an external fuel source (not shown). In some embodiments, the controls/exhaust section 120 also comprises a blower and an exhaust system (not shown) that allows air to travel into the thermal casing 125 to the fuel cell 130 and allows unused fuel, water and gases to leave the system 100. The thermal casing 125 of the fuel cell section 115 provides separation between the fuel cell 130 and the remaining system 100 to protect the other components of system 100 and to retain heat around the fuel cell 130. The thermal insulation 140 is provided to retain as much heat as possible around the fuel cell 130.

The electronics area 110 is coupled to an external load 145 by an electrical connection 150a and to the fuel cell 130 by an electrical connection 150b. The electronics area comprises controls (not shown) that regulate the amount and type of power delivered to the external load 145. In one embodiment, as shown in FIG. 1, electronics area 110 also comprises an alternate power source 155 coupled to the electrical heater 135 via an electrical connection 165, and a charge monitoring circuit 160 via a connection 170. In another embodiment, as shown in FIG. 2, the alternate power source 255 is external to the system 100 but is still coupled to the charge monitoring circuit 160 via a connection 270 and the electrical heater 135 via an electrical connection 265. Because the alternate power source 255 in the embodiment of FIG. 2 is external the system 100, the alternate power source is coupled to the electronics area via an electrical connection 250c. In some embodiments, the alternate power source 155, 255 is at least one rechargeable battery. In other embodiments, the alternate power source 155, 255 could be lead cell battery, an AC power source, a solar panel, etc.

In operation, the system 100 of FIGS. 1 and 2 has two modes, a hibernation mode and an operation mode. When system 100 is in a hibernation mode, electronics area 110 prevents power from being sent to external load 145 and controls/exhaust section 120, and prevents fuel and excess air from entering the fuel cell 130. The electrical heater 135 is powered by the alternate power source 155 to heat the fuel cell 130 to a near operation mode temperature of approximately 700° C. in the case of a SOFC. When the alternate power source is at least one rechargeable battery, the charge monitoring circuit 160 is set to monitor the charge of the at least one rechargeable battery. When the charge of the at least one rechargeable battery reaches a preset lower limit, the system 100 is set to the operation mode, described in detail below. In some embodiments, the system 100 can include a temperature monitoring circuit (not shown) that monitors the temperature of the fuel cell 130 and allows electrical heater 135 to receive power from the alternate power source 155 to maintain an approximate operation mode temperature of the fuel cell 130. Accordingly, some embodiments of the present invention do not require the charge monitoring circuit 160.

When system 100 is in the operation mode, controls in controls/exhaust area 120 allow fuel and air to enter the thermal casing 125, which allows fuel cell 130 to generate power. Power generated by the fuel cell 130 can be sent via electrical connection 150b to the electronics area 110 and from there to the external load 145 via electrical connection 150a or to the alternate power source 155 in the embodiment shown in FIG. 1 or the alternate power source 255 via electrical connection 250c in the embodiment shown in FIG. 2. If the alternate power source 155, 255 is at least one rechargeable battery, the fuel cell 140 recharges the power source 155, 255 until the charge meets or exceeds a predetermined capacity. If the fuel cell 130 is not required to generate power for the load 145 and charge of the power source 155, 255 meets or exceeds the predetermined capacity, the system 100 returns to hibernation mode. By using an electrical heater to maintain the internal temperature of the fuel cell 130 during the hibernation mode, a gross energy savings of 67% and a fuel consumption reduction rate of 33% over traditional methods, such as a combustor/recuperator arrangement or immersing the high temperature fuel cell 130 in a separate burner, can be achieved.

What is claimed is:

1. A system for heating a high temperature fuel cell, the system comprising:
   a high temperature fuel cell for generating power to an external load, wherein the high temperature fuel cell is coupled to a fuel source and an oxygen source; and
   an electrical heater adjacent to the high temperature fuel cell;
   wherein the system is programmed to utilize a hibernation mode and an operation mode, whereby in the hibernation mode the high temperature fuel cell is programmed to not generate power and shutoff the fuel source and the oxygen source, and whereby in the operation mode the high temperature fuel cell is programmed to generate power with a fuel and an oxygen flow from the fuel source and the oxygen source; and wherein during the hibernation mode the system is further programmed to draw power from an alternate power source to power the electric heater and provide heat to the fuel cell during the hibernation mode in order to maintain the temperature of the high temperature fuel cell proximate to an operation mode temperature of the fuel cell.

2. The system for heating a high temperature fuel cell system of claim 1, wherein the high temperature fuel cell system is a solid oxide fuel cell system.

3. The system for heating a high temperature fuel cell system of claim 1, further comprising a control circuit for monitoring the state of the alternate power source and where during the hibernation mode the control circuit is programmed to monitor the state of the alternate power source and is programmed to switch the system from the hibernation mode to the operation mode when the state of the alternate power source reaches a selected first state, and wherein the system is programmed to switch from the operation mode to the hibernation mode when the alternate power source reaches a selected second state.

4. The system for heating a high temperature fuel cell system of claim 3, wherein the alternate power source is at least one of a rechargeable battery, a solar cell, and an AC power source.

5. The system for heating a high temperature fuel cell system of claim 4, wherein the control circuit is a charge monitoring circuit and where during the hibernation mode the charge monitoring circuit is programmed to monitor the charge of the at least one rechargeable battery and is programmed to switch the system from the hibernation mode to the operation mode to charge the at least one rechargeable battery when a charge of the at least one rechargeable battery reaches a preset lower limit, and wherein the system is programmed to switch from the operation mode to the hibernation mode when the at least one rechargeable battery is charged to the full charge capacity and a selected minimum power is being drawn by the external load.

6. The system for heating a high temperature fuel cell system of claim 1, wherein the electrical heater is one of an electrical resistance heater, an electrical convection heater, and an electrical radiative heater.

7. The system for heating a high temperature fuel cell system of claim 1, wherein the oxygen source is an air source.

8. The system for heating a high temperature fuel cell system of claim 1, wherein the system is programmed to disconnect the high temperature fuel cell from the external load when in the hibernation mode.

9. The system for heating a high temperature fuel cell system of claim 1, wherein the system further comprises a thermal insulation section to retain heat within the high temperature fuel cell.

10. The system for heating a high temperature fuel cell system of claim 1, wherein the system is programmed to turn off the electrical heater during the operation mode.

11. A high temperature fuel cell, the fuel cell comprising:
a high temperature fuel cell section for generating power to a load;
a controls/exhaust section for regulating an amount of fuel and air sent from a fuel source and an air source to the fuel cell and an amount of fuel, water and gases to leave the fuel cell; and
an electrical heater coupled to the fuel cell section;
wherein the high temperature fuel cell is programmed to operate such that when the high temperature fuel cell is not generating power, the electrical heater provides heat to maintain an internal temperature of the fuel cell section to near an operating temperature of the fuel cell section and the fuel source and the air source are turned off, and
when the high temperature fuel cell is generating power, the fuel source and the air source are turned on to provide fuel and air, and the electrical heater is turned off.

12. The high temperature fuel cell of claim 11, wherein the high temperature fuel cell section is a solid-oxide fuel cell section.

13. The high temperature fuel cell of claim 11, wherein the electrical heater is one of an electrical resistance heater, an electrical radiative heater, and an electrical convection heater.

14. The high temperature fuel cell of claim 11, wherein the electrical heater is coupled to a temperature control circuit, where the temperature control circuit is programmed to control the electrical heater to maintain the internal temperature of the high temperature fuel cell near the operating temperature of the fuel cell when the fuel cell is not generating power.

15. The high temperature fuel cell of claim 11, wherein the high temperature fuel cell is programmed to electrically isolate the high temperature fuel cell section when not generating power.

16. The high temperature fuel cell of claim 11, further comprising a thermal insulation section to retain heat within the high temperature fuel cell.

17. A system for maintaining the internal temperature of a high temperature fuel cell during a hibernation state, the system comprising:
a high temperature fuel cell for generating power to a load during an operation state, where the high temperature fuel cell is coupled to a fuel source and an air source;
an electrical resistance heater coupled to the high temperature fuel cell;
an electronics component coupled to the high temperature fuel cell, the electronic component receives power generated by the high temperature fuel cell and regulates the power so that a regulated power can be delivered to the load; and
a charge monitoring circuit for monitoring the charge of an alternate power source that is coupled to the electrical resistance heater;
wherein the system includes a hibernation state in addition to the operation state, whereby in the hibernation state the system is programmed to disconnect the high temperature fuel cell from the fuel source and the air source and stop the high temperature fuel cell from generating power and where the electronics component is programmed to electrically isolate the fuel cell and prevent power from being delivered from the fuel cell to the load, and whereby in the operation state the system is programmed to connect the fuel source and the air source to the high temperature fuel cell, start operation of the high temperature fuel cell and connect the fuel cell to the electronics component to deliver the regulated power to the load;
wherein during the hibernation state the electrical resistance heater is programmed to draw power from the alternate power source to provide heat to the high temperature fuel cell from the electrical resistance heater in order to maintain the temperature of the high temperature fuel cell near an operating temperature of the high temperature fuel cell when the high temperature fuel cell is not generating power, and during the operation state the system is programmed to turn off the electrical resistance heater;

wherein during the hibernation state, the charge monitoring circuit is programmed to monitor the charge of the alternate power source and is programmed to switch the system from the hibernation state to the operation state to charge the alternate power source when a charge of the alternate power source reaches a preset lower limit, and wherein the system is programmed to switch from the operation state to the hibernation state when the alternate power source is charged to the full charge capacity and the power is being drawn from the load is below a minimum level.

18. The high temperature fuel cell of claim 11, wherein a temperature controller is coupled to the electrical heater and is programmed to provide heat in order to maintain the internal temperature of the fuel cell section to near a temperature of the fuel cell when the high temperature fuel cell is generating power.

19. The system for heating a high temperature fuel cell system of claim 1, further comprising:

an electronics module coupled to the high temperature fuel cell and the external load, wherein the electronic module is programmed to receive power generated by the high temperature fuel cell and regulate the power so that a regulated power can be delivered to the external load.

\* \* \* \* \*